Nov. 17, 1970 A. H. BOBECK ET AL 3,541,522

MAGNETIC LOGIC ARRANGEMENT

Filed Aug. 2, 1967 9 Sheets-Sheet 1

TYPE B

INVENTORS A. H. BOBECK
H. E. D. SCOVIL
W. SHOCKLEY

BY Herbert M. Shapiro

ATTORNEY

MINOR AND

MINOR OR

INVERT

MINOR AND OPERATION

TYPE A TO TYPE B ROTATION

MAGNETIC LOGIC ARRANGEMENT

Filed Aug. 2, 1967

TYPE B 3,541,522
Patented Nov. 17, 1970

3,541,522

MAGNETIC LOGIC ARRANGEMENT

Andrew H. Bobeck, Chatham, and Henry E. D. Scovil, New Vernon, N.J., and William Shockley, Stanford, Calif., assignors to Bell Telephone Laboratories, Incorporated, Murray Hill and Berkeley Heights, N.J., a corporation of New York Filed Aug. 2, 1967, Ser. No. 657,877
Int. Cl. H01f *10/00;* G11b *5/00*
U.S. Cl. 340—172.5 28 Claims

ABSTRACT OF THE DISCLOSURE

The movement of single wall, reverse-magnetized domains in an otherwise magnetically saturated sheet of magnetic material and the interactions between adajacent domains in that sheet not only permit logic operations to be performed in a simple manner but also permit the multidimensional interconnection of cells in which those operations are performed. The use of such logic operations in a content addressable memory context is described.

FIELD OF THE INVENTION

This invention relates to information storage circuitry characterized by the multidimensional interconnection of logic cells.

BACKGROUND OF THE INVENTION

The term "multidimensional interconnection of logic cells" characterizes an implementation wherein memory and logic functions are performed in the same physical locations. Equipment capable of performing in this manner is referred to as a distributed logic arrangement and is known to permit functional simplicity in systems organization. For example, vast amounts of information can be operated upon simultaneously in such an arrangement permitting considerable programming and cycle-time advantages.

Unfortunately, the practical implementation of such an arrangement is as elusive as it is desirable. Typically, attempts to achieve such an implementation produce arrangements characterized by such a significant amount of additional logic circuitry over and above that necessary to perform the memory function alone that it is economically preferable to perform logic in peripheral equipment and to maintain the memory implementation physically simple and separate. A content addressable memory provides a good example of a distributed logic arrangement, promising the above-mentioned advantages in programming and in cycle time as is well known. In spite of such advantages, content addressable memories, as a practical matter, are not competitive with, for example, random access memory organizations where the memory and logic operations are physically separated.

An object of this invention, then, is a new and novel content addressable memory.

Copending application Ser. No. 579,931, filed Sept. 16, 1966 for A. H. Bobeck, U. F. Gianola, R. C. Sherwood, and W. Shockley (now Pat. 3,460,116) describes an arrangement wherein single wall, reverse-magnetized domains are propagated controllably, by pulses on X and Y oriented propagation conductors, in a sheet of a magnetic material having a preferred direction for flux substantially normal to the plane of the sheet. It has been discovered that next adjacent single wall domains of such an arrangement function as dipoles oriented normal to the plane of the sheet and exhibit interaction forces which, inter alia, tend to repel one another as do like charged pith balls.

Another object of this invention, then, is a memory in which the logic capabilities of the controlled movement and interaction of single wall domains in a magnetic sheet are exploited in a manner to perform logic operations and to permit the realization of multidimensional interconnection of logic cells.

Another object of the present invention is to provide a multifunctional organization in which all computer operations including memory, shift register, arithmetic, etc., functions may be carried out in a simple structure comprising again a single sheet of magnetic material and X and Y oriented propagation conductors for moving single wall domains controllably in X and Y directions.

SUMMARY OF THE INVENTION

Specifically, it has been discovered that the controlled movement and interaction of single wall domains permit the realization of complete sets of logic functions at arbitrary sites in a memory defined in a sheet of magnetic material in which such single wall domains can be moved controllably.

The invention is based on the realization that if information is represented in a magnetic sheet as the presence and absence of single wall domains in each of a plurality of multiposition bit locations, the information can be moved and annihilated selectively in a manner to provide all logic functions as well as the memory function in response to different pulse programs on the propagation conductors, in the absence of any additional structural implementations over and above what is necessary to perform the memory function alone. It is known that a distributed logic capability permits the realization of any computer function. A recitation of bit capacities and operational parameters hereinafter will indicate the practicality of such an arrangement.

In one embodiment of this invention, X and Y oriented conductors on a magnetic sheet are pulsed in a program to operate a sheet of magnetic material as a content addressable memory. The sheet comprises, illustratively, a rare earth orthoferrite material. The conductors are organized illustratively into sets which divide the memory into operational units, to be defined hereinafter, each including fifty-four possible positions for a single wall domain. By controlled movement of and interaction between domains, logic operations may be carried out in each of the operational units. The proper sequencing of field patterns in the magnetic sheet enables the logic operations to be performed and the results of those operations to be collected in prescribed portions of the sheet, permitting the realization of an illustrative content addressable memory operation. An operation such as obtaining a related set of stored items, accordingly, may be performed by programs independent of information stored in the magnetic material and without the need of sensing and effects occuring in the sheet.

DETAILED DESCRIPTION

Figure 1:
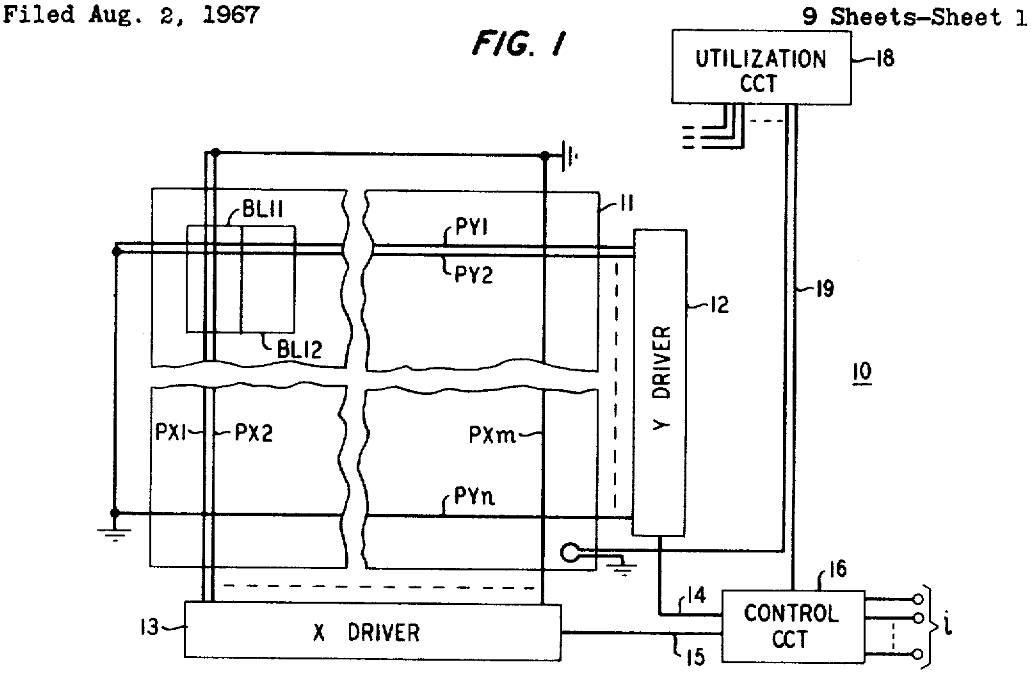
FIG. 1 is a schematic illustration of a memory arrangement in accordance with this invention.

FIG. 1 shows a content addressable memory 10 in accordance with this invention. The memory 10 comprises a sheet 11 of magnetic material characterized by a preferred direction of magnetization substantially normal to the plane of the sheet. A first plurality of propagation conductors PY1, PY2 . . . and PY*n* overlie sheet 11 and are connected between a Y driver 12 and ground as shown. A second plurality of propagation conductors PX1, PX2 . . . and PX*m*, oriented illustratively in a direction perpendicular with respect to the first plurality of propagation conductors, also overlie sheet 11. Conductors PX1 . . . PX*m* are connected between an X driver 13 and ground. The propagation conductors may be made conveniently by means of well known printed circuitry techniques and may take the form of interconnected current loops as disclosed in the aforementioned copending application of Bobeck et al. Alternatively, the conductors may be of a form to produce repetitively varying fields when pulsed as disclosed in copending application Ser. No. 644,351, filed June 7, 1967 for A. H. Bobeck and R. F. Fischer. The structure is entirely analogous to that described in the aforementioned copending applications.

In accordance with this invention the structure is operated in a more flexible manner to provide a variety of functions as will become clear from the detailed description of the illustrative logic operations and the use thereof in a content addressable memory operation.

In order to operate the structure to utilize its full flexibility, it is necessary to pulse the propagation conductors PY1 . . . PY*n* and PX1 . . . PX*m* in a programmed fashion. To this end, the X and Y drivers are connected by representative conductors 14, and 15, respectively, to a control circuit 16. Control circuit 16, in turn, is responsive to coded input signals on input conductors designated *i* collectively in FIG. 1.

A utilization circuit 18 also is connected to control circuit 16 via a conductor 19. Circuit 18 includes a plurality of inputs each coupled to a different position of sheet 11 in a manner discussed hereinafter and completely consistent with the teachings of the above-mentioned Bobeck-Gianola-Sherwood-Shockley application.

The various circuit elements may be any such elements capable of operating in accordance with this invention.

The use of sheet 11 and the propagation conductors and drivers as a two-dimensional shift register is disclosed in the above-mentioned Bobeck-Gianola-Sherwood-Shockley application. In that application various implementations for introducing single wall domains into sheet 11 are discussed. We shall assume that a source of domains is present in sheet 11 and that pulses applied to the propagation conductors move domains from the source to positions required initially in accordance with the following detailed description in a manner consistent with the teaching in that application.

Information is stored herein in sheet 11 as the presence and absence of single wall domains in selected positions as in each of the aforementioned applications. In accordance with this invention, however, the information is represented as a pattern of single wall domains in bit locations organized in a manner and spaced apart to enable various logic operations.

The various logic operations are discussed first along with the pulse programs for performing such operations. Then various of those logic operations are described in terms of consecutive input pulse programs for providing all match words in memory as is required of content addressable memories. In order to understand the various logic operations, however, it is helpful to understand fully an illustrative organization of an arrangement in accordance with this invention and that organization is discussed as a basis for the discussion of the logic operations.

BASIC ORGANIZATION

Figure 2:
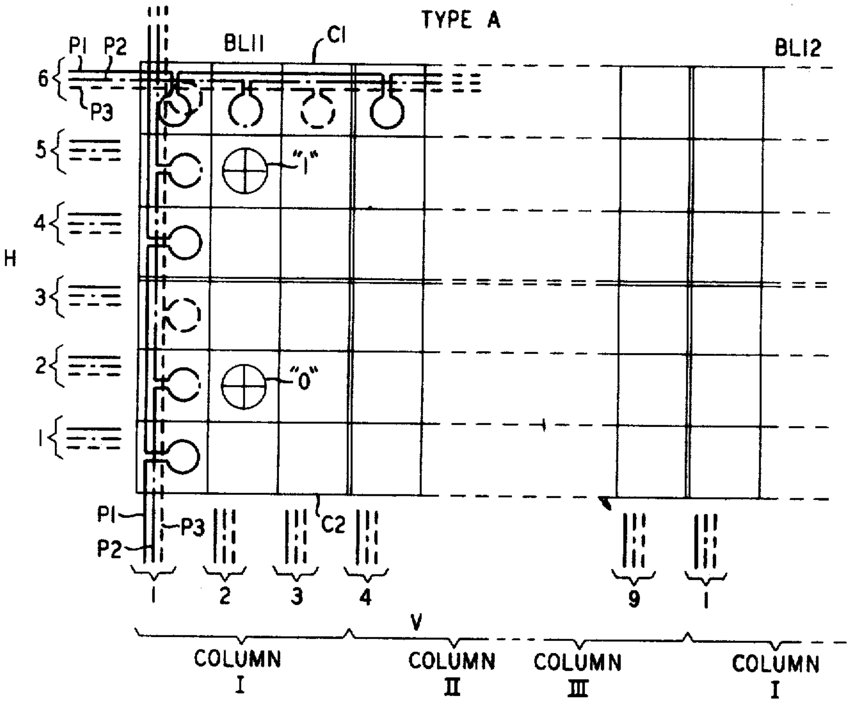
FIGS. 2 through 42 are schematic illustrations of portions of the arrangement of FIG. 1 illustrating magnetic configurations therein during operation.

The organization of the arrangement of FIG. 1 may be understood in terms of imaginary blocks related to the propagation circuit which operates to move single wall domains in the magnetic sheet. The aforementioned Bobeck-Gianola-Sherwood-Shockley application, for example, describes interconnected conducting loops which are pulsed in a three-phase manner to move single wall domains in a selected direction. Such interconnected loops are shown in FIG. 2 superimposed on an imaginary arrangement of blocks which provide a handy symbol representing a basic operational unit of the arrangement of FIG. 1 as described hereinafter. The blocks may be thought of as arranged in rows and columns. Propagation conductors including interconnected conducting loops oriented along rows of blocks are designated H, for horizontal; those oriented along columns of blocks are designated V, for vertical. There are six representative H conductors H1 . . . H6 and nine representative V conductors V1 . . . V9 shown. Each representative conductor indicated by the brackets in the figure includes three distinct sets of interconnected conducting loops P1, P2, P3 as designated for conductors H6 and V1. The P1 set couples the first, fourth . . . blocks; the P2 set couples the second, fifth . . . blocks; and the P3 set couples the third, sixth . . . blocks reading from left to right for conductor H6 or from bottom to top for the V1 conductor.

Each block may be designated by the representative propagation conductor and by the phase (P1, P2, or P3) coupled to the magnetic sheet at that block. Thus for example, the blocks from bottom to top coupled by conductor V1 are designated V1P1, V1P2, V1P3 and then the block designations repeat. The designations of the blocks from left to right along conductor H6 are H6P1, H6P2, H6P3, and then the designations repeat. Each block is, of course, associated with two conductors and, accordingly, may be designated in two ways. The following table shows the designations for each block in a group of eighteen blocks in column I of FIG. 2. Specifying the designations of these two circuits identifies uniquely a block in that set of eighteen blocks.

TABLE I

| | | |
|---|---|---|
| H6P1 V1P3 | H6P2 V2P3 | H6P3 V3P3 |
| H5P1 V1P2 | H5P2 V2P2 | H5P3 V3P2 |
| H4P1 V1P1 | H4P2 V2P1 | H4P3 V3P1 |
| H3P1 V1P3 | H3P2 V2P3 | H3P3 V3P3 |
| H2P1 V1P2 | H2P2 V2P2 | H2P3 V3P2 |
| H1P1 V1P1 | H1P2 V2P1 | H1P3 V3P1 |

We have now established a set of unique correspondences between the various imaginary blocks of a set of eighteen blocks as shown in FIG. 2 and the H and V propagation conductors which couple those blocks.

Such a set of eighteen blocks defines a bit location in which the presence and absence of a domain represents a binary value. If we start with a sheet of magnetic material having the preferred direction for magnetization normal to the sheet and assume the sheet saturated in a direction away from the reader, the negative direction, then a small domain magnetized towards the reader may be represented by an encircled plus sign. Such a domain may occupy the position of any block in FIG. 2. If a domain is stored in one of the blocks V2P2 also coupled by a conductor H5P2 or H2P2 (and a domain is absent in the other), it represents a binary one and a binary zero respectively. The binary one and zero positions for a domain are shown by the encircled plus signs in FIG. 2. The associated absence of a domain is represented by a circle without the plus sign hereinafter. Each set of eighteen blocks as shown in the table and in FIG. 2, then, corresponds to a bit location. Only one domain at a time is present normally in a bit location.

Binary one and zero representations are moved selectively by pulses on propagation conductors. A (propagation) pulse on a propagation conductor generates a (positive) field directed toward the reader at each conducting loop therealong. Actually, the positive field is generated only within the conducting loops along the pulsed conductor. Outside the loops are negative fields directed away from the reader. A single wall domain thus actually sees a field gradient which causes movement of that domain and a positive pulse on a propagation conductor is taken to cause such a gradient. A pulse on conductor V2P3 then moves upward, one block to the correspondingly designated blocks, either the one or the zero representation as shown in FIG. 2 (only one representation at a time is present in a bit location). Similarly, a pulse on conductor V3P2 moves either representation one block to the right. A pulse on conductor H2P3, however, moves to the right only a domain in a block H2P2 of the table while a pulse on conductor H5P3 moves to the right only a domain in a block H5P2. The propagation circuitry may be seen to be organized to generate a propagation field in any selected block in the described set of eighteen blocks.

Each uniquely accessed set of eighteen blocks comprising a bit location has adjacent to it, in either the horizontal or vertical direction, similar uniquely accessed sets of eighteen blocks comprising other bit locations. Each of those blocks may be designated as discussed above, remembering that the V conductors are designated one through nine and the designations of blocks will reflect such conductor designations. The sheet, accordingly, may be thought of as organized into sets of eighteen consistently designated blocks, each set comprising a bit location.

A basic operational unit may be defined in terms of related bit locations on the basis of normal usage. In the illustrative organization, specifically, not all bit locations are used normally for storage. It is convenient, at this juncture, to think of the magnetic sheet of FIG. 1 organized into rows and columns of bit locations. The columns are designed I, II, III, I, II, etc. in FIG. 2 for adjacent bit locations in a row of bit locations. Only the bit locations in a column I are utilized as permanent information storage areas. The remaining columns of bit locations are reserved for operations on the binary representations stored in a column I. A basic operational unit for the illustrative organization, accordingly, may be defined as a row of three sets of eighteen blocks, one in each of columns I, II, and III as shown in FIG. 2. The representative H and V conductors shown in FIG. 2 now may be seen to be designated to correspond to the basic operational unit.

All like designated blocks in bit locations along a particular row or column of bit locations have like fields generated therein when the propagation conductor coupled to the magnetic sheet at those blocks is pulsed. It is noted in FIG. 2 that the designations for the columns of bit locations repeat, indicating that the basic operational unit repeats along any given row of bit locations. The vertical (V) conductors associated with a basic operational unit are designated 1 through 9 in FIG. 2. Along any given row of bit locations, therefore, many vertical conductors have like designations. In the illustrative operation, all like designated vertical conductors are assumed pulsed in parallel. Similarly, the horizontal (H) conductors associated with a basic operational unit are designated 1 through 6. Accordingly, along any given column of bit locations, many horizontal conductors have like designations. In the illustrative operation, however, we assume that like designated horizontal conductors are pulsed individually.

The blocks of a bit location may be thought of as arranged in cells. A set of eighteen blocks corresponding to a bit location is represented in two distinct sets one below and one above a double line in column I of FIG. 2. The set of nine blocks above the double line in each bit location is referred to as a cell designated C1; the set below the double line is similarly designated C2. Cells C1 and C2, then, together comprise the bit location labeled BL11 in FIG. 2. If a domain, as shown in FIG. 2 is present in cell C1 but not in cell C2, a binary "1" is said to be stored in bit location BL11. On the other hand, if a domain is present in cell C2 but not in cell C1, a binary "0" is said to be stored.

Figure 3:
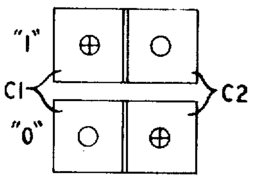

The cells of a bit location may be arranged in either of two orientations. FIG. 2 shows a cell C1 and a cell C2 arranged vertically with respect to one another. Such an arrangement is designated type A. Another arrangement is where cell C1 and cell C2 are arranged horizontally with respect to one another as shown in FIG. 3. The latter is designated type B. FIG. 3 shows the type B arrangement in abstract form including only cells C1 and C2 separated by a double line without the block or propagation conductor representations. Both a one and a zero representation are shown as would be the arrangement if neighboring bit locations included the specified information. A clockwise rotation of 90 degrees of either representation in FIG. 3 permits a simple visualization of the correspondence between the type A and type B form and the origin of the abstraction used in FIG. 3. We will have occasion to change the information format from type A to type B during the illustrative operation described hereinafter and it is convenient to refer to the two cell symbol as a "domino" during that description.

The various logic operations are now described in terms of the foregoing organization. The reader's attention is drawn to the fact that there are four basic physical steps underlying those operations. Specifically, a domain is moved, annihilated, and split into two. In addition, two domains repel each other in any attempted collision therebetween. These steps will be explained during the discussion of the logic operations and we will have occasion to refer to the steps again hereinafter.

LOGIC OPERATIONS

Replicate

Figure 4:
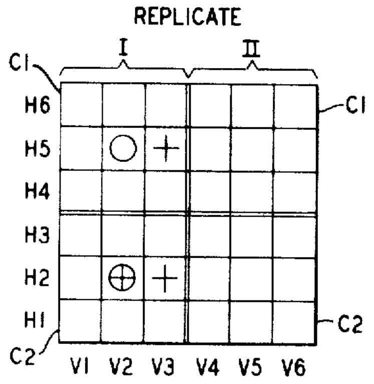
Figure 5:
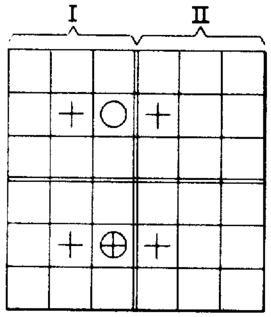
Figure 9:
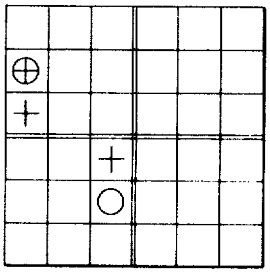
Figure 6:
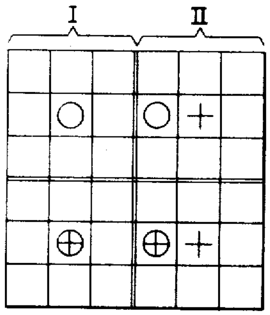
Figure 10:
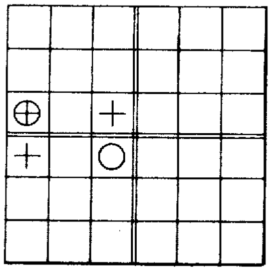
Figure 7:
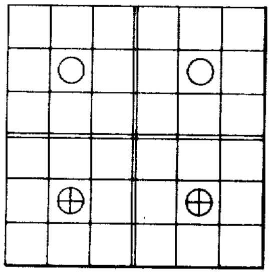
Figure 11:
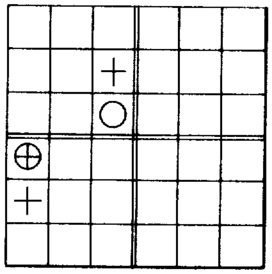
Figure 12:
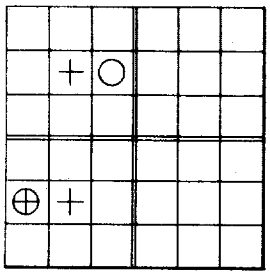

The first logic operation is called the replicate operation and results in a duplication of information in memory. FIG. 4 shows first and second adjacent sets of eighteen blocks for which the block designation discussed in connection with the chart above applies. The sets of blocks conveniently are arranged in columns I and II, respectively, as shown in FIG. 2. Each set of blocks includes a cell C1 and a cell C2. A binary zero representation is shown as a circle and an associated encircled plus sign stored in the cells C1 and C2 of column I respectively. The binary representation shown is moved one column of blocks to the right conveniently by a pulse on conductor V3P2 which generates (+) propagation fields in the blocks indicated in FIG. 4. The information representation, in response, moves to blocks H2P3 and H5P3 as shown in FIG. 5. In accordance with assumed pulsing arrangement, fields are generated in other blocks. Such fields are ignored in the description of the various logic operations. Next, pulses are applied concurrently to conductors V2P2 and V4P2 generating the propagation fields (+) shown in FIG. 5. The binary representation splits, moving in response to positions shown in FIG. 6. Those pulses are followed by a pulse on conductor V5P2 generating propagation fields indicated by the plus signs in FIG. 6. FIG. 7 shows the resulting disposition of binary representations. The binary representation originally only in a bit location in column I now appears, as well, in an associated bit location of column II and the replicate operation is complete.

It may be appreciated that the replicate operation is carried out in response to propagation fields generated simultaneously in blocks to each side of a binary representation. The operation is basically that of moving information. But when a field of a polarity to move information is generated to each side of a binary representation, a constraint is imposed on the movement of the representation in response. It is remembered that a binary representation comprises a domain present in a first position and absent in a second position. In order to simplify the explanation, we may adopt the convention that a binary representation comprises two indications, one of which is a domain and the other of which is an absent domain. The constraint, then, necessitates that each indication split. This is no problem for an absent domain of course. A domain, however, is thought to change its shape during the splitting process to first an oval then a dumbbell configuration before being split by the negative field generated about each positive propagation field. In some circumstances an additional negative field may be generated in the position of the constricted portion of the dumbell in order to foster splitting. But for the most part such additional negative fields are unnecessary. An understanding of the nature of the splitting of a domain, however, is not important for an understanding of this invention. Suffice it to say that the splitting of a domain in response to the generation of propagation fields to both sides thereof is observed. Typically, the fields for accomplishing such a split are greater than an ordinary propagation field, which is of the order of a few oersteds for most suitable magnetic materials, as is discussed further hereinafter.

Invert

The next logic operation is called the invert operation and results in the reversal of a binary representation. For example, if a binary one is represented by a domain in a block H5P2 and the absence of a domain in a block H2P2 of an illustrative bit location as shown in FIG. 8, the invert operation results in a domain in block H2P2 and the absence of a domain in block H5P2.

The operation is carried out by generating a sequence of pulses which propagate domains (and the absence thereof) from one position to the next. This may be carried out in many ways. Illustratively, the pulse sequence H2P3, V3P3, V3P1, V3P2, and H5P2 moves a domain (or absence thereof) from block V2P2 (or H2P2) to block H5P2. The pulse program H5P1, V1P1, V1P3, V1P2, and H2P2 concurrently moves a domain (or absence thereof) from block H5P2 to block H2P2.

Figure 8:
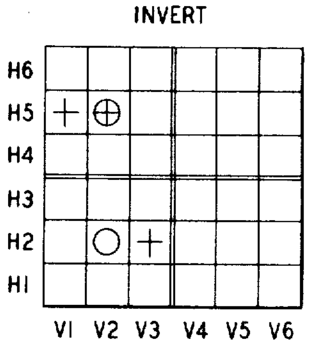
Figure 13:
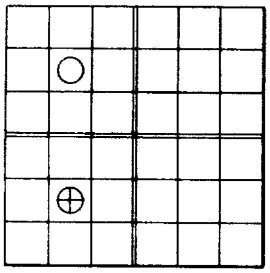

FIGS. 8 through 13 show the consective results of the steps of the invert operation. Each figure includes plus signs representing the fields for effecting the next consecutive movement. A comparison between FIGS. 8 and 13 shows that inversion is actually realized.

The AND operation

It is recalled that each binary representation is in a form comprising first and second indications in a cell C1 and a cell C2 respectively. Corresponding cells C1 in two adjacent binary representations include the presence or absence of a domain and those indications are in blocks H5P2 as shown in FIG. 2, spaced apart by two intervening blocks. Similarly, each of cells C2 of adjacent bit locations includes an indication in a block H2P2 and those blocks are also spaced apart two blocks. For convenience, when both indications of a binary representation are referred to they are described as occupying or being moved to "positions." When only a single indication is referred to, the block indication is used.

The AND operation between first and second binary representations comprises initially moving those representations to first and second positions spaced apart by an intermediate position. The indications in adjacent like designated cells, accordingly, are stepped together one block. The operation comprises a program of pulses in first and second positions and in intermediate positions. The first and second positions are defined specifically as positions occupied by first and second binary representations of, for example, type A form as shown in FIG. 2 spaced apart one column of blocks. The "intermediate position" refers collectively to the two blocks, of the intermediate column of blocks, separating the indications in the first and second binary representations.

The operation between the indications in adjacent cells C1 is different from the operation on the indications in adjacent cells C2. With respect to adjacent cells C1, a propagation field is generated to move domains (or the absence of domains) into the intermediate block. If two domains are present, only one moves into the intermediate block to the exclusion of the other because of a mutual repulsion exhibited between two adjacent domains (like charges). Next, a field is generated, in the intermediate block, of a polarity to annihilate any domain there. Subsequently, another propagation field is generated in the intermediate block to move there any domain remaining in the adjacent blocks of the first or second positions. It is clear that a domain now occupies the intermediate block only if a domain were present in each of the adjacent cells C1 and to this extent constitutes an AND operation between adjacent cells.

The AND operation between adjacent binary representations, however, is not yet complete. The domains (and absence of domains) in adjacent cells C2 of those representations must be operated upon. A propagation field is generated in the corresponding block of the intermediate position, to this end, and again only one domain (if present) moves in response. In this instance, however, fields of a polarity (negative) to annihilate domains are generated in the adjacent blocks of the first and second positions rather than in the intermediate block. If a domain were present in either the associated blocks of the first or second position initially, a domain occupies the intermediate block at the termination of the pulse sequence. To the extent that a domain does occupy the intermediate block if at least one of the associated blocks of the first and second positions were occupied by a domain initially, the operation may be thought of as an OR operation between two adjacent cells C2. The AND operation between two adjacent binary representations may be thought of, then, as an AND operation between cells C1 of those representations and an OR operation between cells C2 of those representations. In order to avoid ambiguities, an AND operation between adjacent cells is referred to as a "MINOR AND" operation and an OR operation. between adjacent cells is referred to as a "MINOR OR" operation. The AND operation between adjacent representations is referred to as an AND operation. As is described hereinafter, an OR operation between adjacent representations is referred to as an OR operation.

Figure 14:
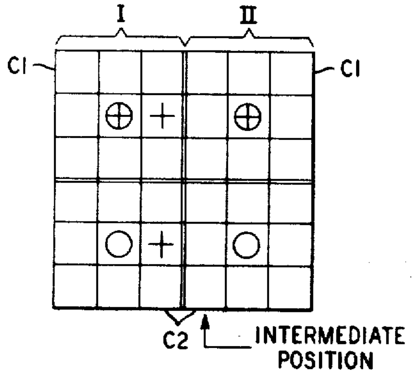
Figure 15:
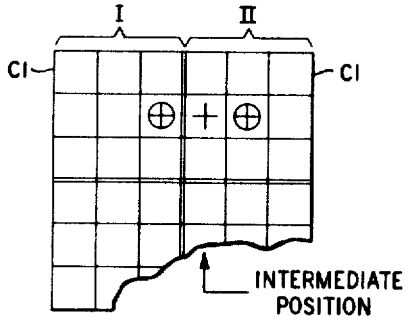

Let us now consider the MINOR AND operation in detail. The specific example we shall illustrate consists of a domain stored as shown in FIG. 14 in cells labeled C1 in columns I and II respectively. The MINOR AND operation, illustrated in FIGS. 14 to 18, can be described briefly as follows: Vertical conductors **V4P*i* identify the selected column of blocks including an intermediate block in which the final indication is stored. The desired result is that a domain be left in this intermediate block only if domains were present initially in both cells C1** in columns I and II as shown in FIG. 14.

The MINOR AND pulse sequence involves several steps including, principally, the annihilation of one domain and placement of the remaining one in the intermediate column. As may be seen from the following description, it is immaterial which domain is annihilated. In specific detail shown in FIG. 15, a pulse is applied to conductor V4P2 so as to produce an attractive field at block V4P2 as indicated in the figure. Only one of the two domains moves to the intermediate block, the other being excluded by the repulsion forces present during an attempted collision between adjacent domains.

It is conceivable that specially symmetric positions would result in a situation of unstable equilibrium in which neither domain would enter fully the intermediate block but both would move in only part way. This unstable equilibrium has not been found to be of practical importance and an actual situation has never been observed to occur. The possibility of such an equilibrium may be avoided altogether by deliberately altering the symmetry of the propagation wiring geometry slightly such as making the current driving loops somewhat noncircular.

Figure 16:
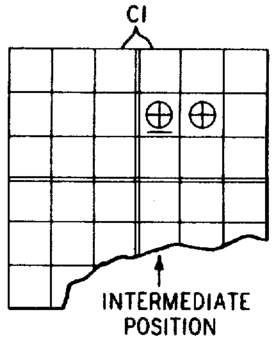

The result in which the domain from column I moves to the intermediate block is illustrated in FIG. 16. That domain is annihilated by generating a field of negative polarity in the intermediate block via a pulse on conductor V4P2. The field is indicated by the minus sign in FIG. 16. It is evident that had the domain initially in column II in FIG. 15 moved to the intermediate block it would have been annihilated.

Figure 17:
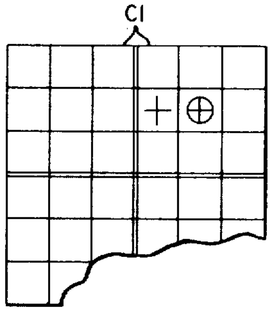
Figure 18:
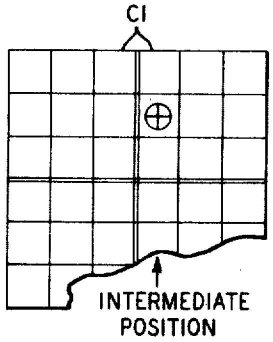

A (positive) propagation pulse is next applied to conductor V4P2 as shown in FIG. 17 so that the remaining domain is drawn to block V4P2 as shown in FIG. 18.

From the foregoing it is evident that a domain will appear in the intermediate block if and only if domains were present originally in both of the two C1 cells of columns I and II. If only one domain is present it would be destroyed by the operation described in connection with FIGS. 16 and 17 so that no domain would be present in the final situation.

Figure 19:
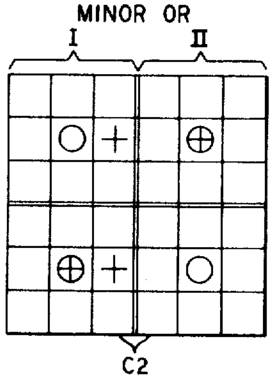
Figure 20:
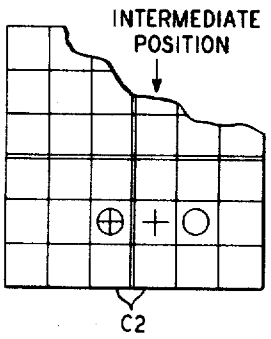

The MINOR OR operation functions so that a domain would be left in the intermediate block if one were present in either of two spaced apart cells. This is illustrated in FIGS. 19–22 for a specific case in which a domain is present in the C2 cell of column I and absent in the cell C2 of column II. This domain disposition corresponds to representations in the bit locations of column I and column II of a zero for column I and a one for column II, as shown in FIG. 19.

Figure 21:
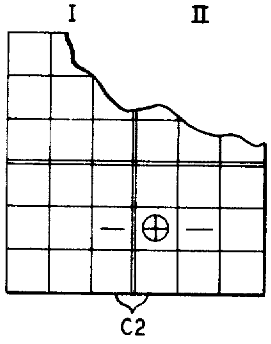

The operation proceeds initially in the same fashion as the MINOR AND and in fact the same set of vertical conductors can be used up to the point corresponding to FIG. 16 for the MINOR AND. This is clear from a comparison between FIGS. 14 and 19 and between FIGS. 15 and 20. A comparison between FIGS. 16 and 21 shows that a domain occupies the intermediate block in each case. It is evident in the MINOR OR operation that a domain exists in the intermediate block if one were present in either column I or column II initially.

Figure 22:
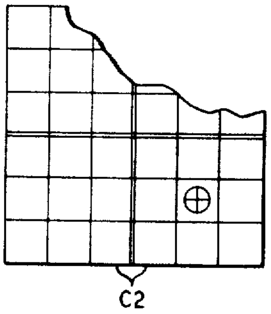

The annihilate step is however different for the MINOR OR as stated above. As illustrated in FIG. 21, annihilation fields are developed not in the intermediate block as for the MINOR AND operation but instead in the associated blocks of adjacent cells C2 in columns I and II. The effect is to leave, after the fields represented by minus signs have been applied in FIG. 21, one and only one domain present in the intermediate block only if a domain were present in either of the two C2 cells or in both initially. FIG. 22 represents the shift of this domain to the center block of cell C2 in column II which is its normal position for a representation in column II.

The following truth Table II is well understood in the parlance of logic operations:

TABLE II

| AND | 0 | 1 |
|---|---|---|
| 0 | 0 | 0 |
| 1 | 0 | 1 |

It is clear from the table that the AND operation functions to provide a binary one representation only when two binary one representations are operated upon. It may be seen from FIGS. 2 and 3 that information processed as described, where a MINOR AND operation is carried out between adjacent cells C1 and a MINOR OR operation is carried out between adjacent cells C2, provides results consistent with the table.

OR circuit

The following truth Table III is also well understood in the parlance of logic operations:

TABLE III

| OR | 0 | 1 |
|---|---|---|
| 0 | 0 | 1 |
| 1 | 1 | 1 |

It is clear from the table that the OR circuit functions to provide a binary one representation except when two binary zero representations are present initially. Such an operation is realized between adjacent representations by carrying out a MINOR OR operation between adjacent cells C1 and a MINOR AND operation between adjacent cells C2. It may be appreciated that the operation is the reverse of the AND operation as is also indicated by a comparison between Tables II and III.

In carrying out the various logic operations herein, it is necessary to provide certain fields in the various blocks shown in FIG. 2. Each such field may be provided by a pulse on an H or a V conductor. The particular conductor selected for pulsing in a particular operation is determined by the effect on other bit locations therealong of a pulse applied to that conductor. A proper choice of conductors permits certain economies, for example, when an AND operation is carried out because both the MINOR AND and the MINOR OR operations may be carried out simultaneously requiring like pulses except for the annihilate steps in the operations. Useful circuits, accordingly, are arranged such that like operations are carried out along one coordinate conductor to economize, and annihilate operations are carried out along the other coordinate conductors for affecting alike only like designated cells of different bit locations.

We have now discussed the basic organization of an arrangement in accordance with this invention and a number of the possible logic operations capable of being performed thereby. We are now in a position to demonstrate an illustrative content addressing operation comprising some of the illustrated logic operations.

The illustrative content addressing operation will be seen to comprise familiar functions. First, a duplicate representation for each word in memory is provided. Second, that duplicate is operated upon, in accordance with the applied match character, designated the "input tag," for generating match and mismatch indications. Third, all match indications and associated stored words are made available. All operations are carried out merely by providing fields in selected blocks of various bit locations for moving domains from block to block or for annihilating domains in selected blocks.

These general functions may be translated into terms of consecutive logic operations in accordance with this invention thus providing an outline of the following illustrative operation:

(1) The duplication of all words in memory, of course, is carried out by the replicate operation. Since all bits of all stored words are to be duplicated, V conductors are used for the operation. Only bit locations in columns I are used for storage. The replicate operation thus merely provides a duplicate word in each instance in the associated column II.

(2) In order to generate the match and mismatch information, the duplicate words are moved, illustratively, to a separate portion of the memory where operations thereon do not disturb stored information. To this end, V conductors are employed to propagate information along columns II to a separate "logic" portion. It is evident that H conductors may be used to operate on information in column II in the logic portion of the memory without disturbing associated information in columns I of the original storage portion.

An invert operation is next carried out on information in columns II in the logic portion by means of pulses on H conductors.

It should be made clear at the outset that the invert operation is responsive to an external signal. The signal in this case is the input tag which specifies what the first group of binary representations should be for which a match is desired. It is to be understood that these representations can be any group of binary representations anywhere along the word. This input signal selects the appropriate H conductors in the logic portion. In response to that signal, the content of each of selected binary bit locations in each word is shifted to an associated column III where for simplicity of programming it is inverted as already described. The programming for the inversion operation need not be adjusted in accordance with the input tag but is an invariant inversion operation which can be accomplished no matter what input tag is selected in a manner to be described hereinafter. After the inversion operation is completed, each inverted binary bit is then transported back to the associated column II via pulses on H conductors.

Each column II in the logic portion at this juncture in the operation contains a binary word. However, only those words having a match tag which matches the input tag now include all binary one representations. The bit representations in column II are rotated from type A to type B form in order to carry out MINOR AND operations between adjacent indications in columns II and between adjacent indications in columns III. Consecutive MINOR AND operations provide a domain, indicating a match, in a column II only if each cell in the corresponding column includes a domain. A match is indicated by a word of all binary one representations. When such words are rotated to the type B form, column III includes no domains.

(3) For each match between the match tag of a stored word and the input tag, a single domain is present in the associated column II of the logic portion in the cell C1 of, illustratively, the first bit location. Consecutive replication operations are then carried out via H conductors to generate domains in each cell of column II associated with the match tag. Naturally, each replicate operation is alternated (or concurrent) with suitable propagation fields for properly positioning the most recently replicated domain. When all cells are occupied in this manner, the sets of domains in columns II are propagated to associated columns III. It is important to note that each cell in the logic portion in columns III now includes a domain. Thus a continuous sequence of domains is provided in columns III of the logic portion associated with matched words in corresponding columns I of the storage portion.

The stored words in the storage portion are then replicated and moved to associated columns II of the logic portion to align with the match and mismatch indications. MINOR AND operations are then carried out between indications in cells in columns II and indications in corresponding cells in associated columns III. It is evident that all match words are preserved and all mismatched words are eliminated.

What is accomplished is that only those stored words which have matching tags are made available in the logic portion. This is accomplished in response to an external signal which specifies the input tag in a manner to effect inversion of appropriate bits of the match tag. The external signal, it is clear, controls the H conductors driven in this operation. This is the only time the operation is effected directly by external signals in the illustrative operation. No reading of the result of any operations is required and the remaining logic operations which result in the elimination of all mismatched words and the retention of all matched words occur on the basis of a preassigned program as is described hereinafter.

It is helpful at this juncture in the description to include a glossary of terms for easy reference in the description of the illustrative embodiment.

(1) Bit location—a group of eighteen blocks arranged in three adjacent columns of blocks as shown in Table I above.

(2) Cell—nine blocks comprising one-half a bit location.

(3) Binary representation—a representation including both the presence and absence of a domain at first and second positions in a bit location.

(4) An indication—either the presence or absence of a domain tantamount to one-half of a binary representation.

(5) Basic operational unit—three adjacent bit locations in a row.

(6) Intermediate position—refers collectively to two blocks, in a column of blocks, separating corresponding indications in two binary representations spaced apart by that column of blocks.

(7) Intermediate block—a block spacing apart first and second corresponding indications in first and second spaced apart binary representations.

Illustrative operation

Figure 23:
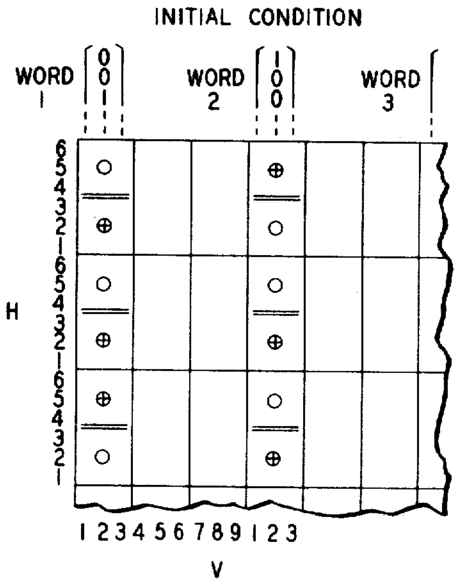

FIG. 23 shows a portion of sheet 11 of FIG. 1 in which each of first and second binary words is represented by consecutive dominoes arranged from top to bottom in the type A configuration of FIG. 2. Only two words are indicated and only the match tags of those words are shown. Specifically, the first (top) three bits of each word are taken to be the match tag of each of those words. We will assume that single wall domains are provided initially and then moved by means described in the above-mentioned copending application of Bobeck, Gianola, Sherwood, and Shockley to the positions shown.

FIG. 2 shows a row of bit locations where each bit location is arranged in a column of bit locations. The columns are designated I, II, and III and then the designations repeat from left to right as has been discussed before. Adjacent binary words as shown in FIG. 23 are stored in consecutive bit locations, from top to bottom as viewed, along only columns I. Thus, next adjacent stored binary words occupy bit locations in columns of bit locations spaced two columns apart in accordance with our assumed basic operational unit.

FIG. 23 shows only the match characters of each word hereinafter referred to collectively as the match tag. It is important to understand, however, that the remainder of each word is present also. The match tags are 001 and 100 reading downward in each column I, first the left-hand column and then the right-hand column as viewed.

The various logic operations are illustrated in terms of the domino symbol of FIGS. 2 and 3 in the discussion of the illustrative content addressing operation.

The pulses for performing the various logic operations are provided via the Y and X drivers 12 and 13 of FIG. 1 under the control of control circuit 16. To this end, propagation conductors PY1 . . . PY*n*, and PX1 . . . PX*m* of FIG. 1 may be seen to correspond to the propagation conductors of FIG. 2. The designations for those conductors described in connection with FIG. 1 permit ready comparison with the description in the aforementioned copending application. The designations used in connection with FIG. 2 permit a simple description of the illustrative organization of the present invention.

Replicate operation

Figure 24:
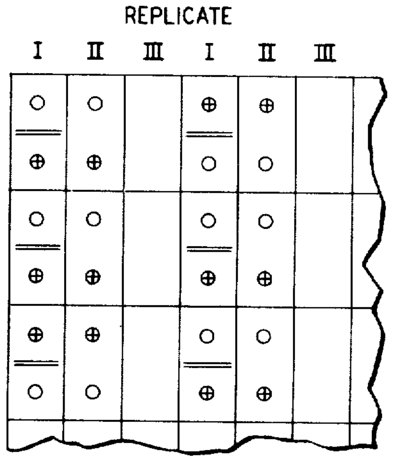

The first logic operation in the illustrative content addressing operation is to replicate all stored words. The result of such an operation on the match tag of word one and word two is shown in FIG. 24. It is seen from the figure that the match tag is repeated in the column II to the right next adjacent the initial storage column I as viewed in FIG. 24.

The pulse program for replication is as follows: First a pulse is applied to conductor V3P2 causing the presence and absence of domains (i.e., the indications) in the initial binary representations in column I of FIG. 23 to move one block to the right as viewed in FIG. 2. Second, a pulse is applied to each conductor V2P2 and V4P2 in the storage portion of the memory resulting in the actual replication and the return of one set of indications to the initial position in corresponding columns I as shown in FIG. 24. Third, a pulse is applied to conductor V5P2 to move the newly generated indications to the proper positions in the center column of blocks of column II in accordance with the illustrative scheme for binary representations, as shown in FIG. 24. These three consecutive field patterns complete the replicate operation.

Move to logic portion

Figure 25:
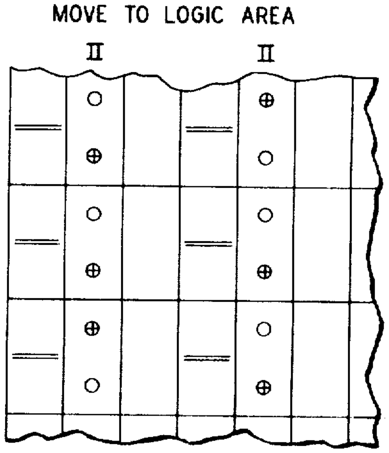

FIG. 25 shows the duplicate of the representative match tags in the absence of the original binary representations. It is convenient but not necessary to move the duplicate representations to a different logic portion of sheet 11. The movement of information is carried out merely by pulsing conductors V5P1, V5P3, V5P2, V5P1 . . . consecutively operating columns II of the sheet as (vertical) shift register channels. The integrity of the information is maintained as disclosed in the aforementioned copending application. FIG. 25 then may be considered to represent a logic portion of sheet 11 positioned with respect to the position of the initial information so that it can be reached by the shifting pulse program just described.

Invert operation

The next operation is to invert all bits in match tags in positions corresponding to the relative positions of zeros in an assumed input tag. We will assume that 001 is the input tag in order to illustrate a match and a mismatch in the illustrative content addressing operation. The first and second bits of the match tag of each word in memory are inverted accordingly in response to an external signal which determines, via control circuit 16 of FIG. 1, which H conductors are driven for this operation.

Figure 26:
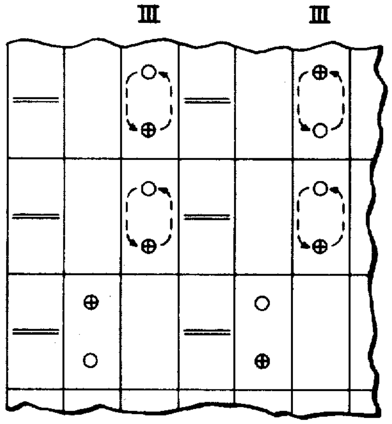

The first step in the invert operation is to move to the right, from column II to column III, the binary representation in each of the first two bit locations of the match tag of every stored word in the logic portion of the memory. FIG. 26 shows the results of such an operation for the representative stored words in response to the assumed input tag. The first word, to the left as viewed, includes two zeros in the first two bit locations. Consequently, the domains and associated absence of domains representing those zeros are moved one column to the right to column III there again representing zeros as shown in the figure. The second word, on the other hand, includes a one and a zero in the first and second bit locations respectively. Therefore, the domains represent those binary values when moved to column III.

The pulse program for shifting the binary representations of the first two bit locations from column II to column III, in the logic portion, changing the disposition of domains from that shown in FIG. 25 to that shown in FIG. 26 is as follows: First, conductor H2P3 is pulsed. Each domain in a block H2P2 in column II moves one block to the right in response. Next the H5P3 conductor is pulsed. In response, each domain in a block H5P2 in column II moves one block to the right. Sequentially (or concurrently), conductors H2P1, H5P1, and then H2P2, and H5P2 are pulsed completing the movement of such domains from column II positions to corresponding positions in column III as shown in FIG. 26. Now the information is in a column where it can be inverted without disturbing other stored information which is not to be inverted.

The actual invert operation then is performed only on information now in column III in the logic portion and consists of exchanging the positions of domains and absence of domains in the one and zero representations in each bit location one for the other. Thus if a domain is in a position to represent a one in a particular bit location, that domain is moved to the "zero" position and the absence of a domain in that zero position is simultaneously moved to the "one" position. This operation is indicated by the broken arrows in FIG. 26.

Figure 27:
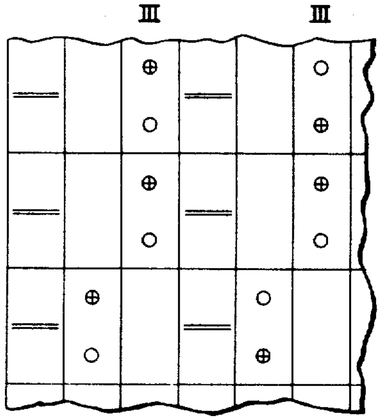

The result of the invert operation is shown in FIG. 27. The pulse program for achieving that result comprises consecutive pulses on conductors H2P3, H5P1, V9P3, V7P1, V9P1, V7P3, V9P2, V7P2, H2P2, and H5P2. A comparison of FIGS. 26 and 27 indicates the inversion of information in column III.

Figure 28:
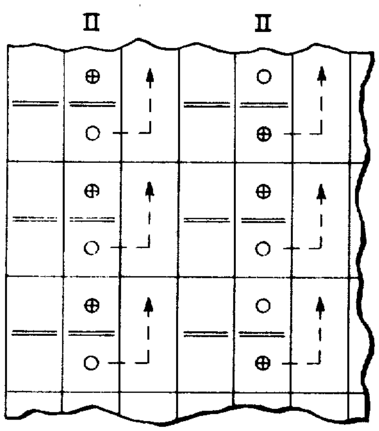

The information in column III is then moved back into corresponding columns II as shown in FIG. 28. This operation is accomplished by a pulse program comprising pulses on conductors H2P1, H5P1, H2P3, H5P3, H2P2, and H5P2. The inversion operation is now complete.

Type A to type B conversion

Figure 29:
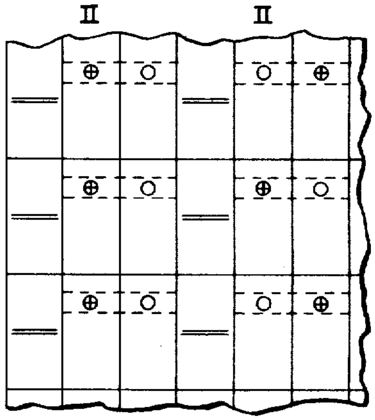

It is next desired to perform MINOR AND operations between the indications in corresponding cells in next adjacent binary representations in a column of bit locations. In order to do so, it is convenient to change the form of the information from type A as shown in FIG. 2 to type B as shown in FIG. 3. A simple "rotation" of the indication in one cell about the indication in the other of each binary representation accomplishes the change as is indicated for each representation by the broken arrows in FIG. 28. The resulting type B form is shown in FIG. 29, the domino symbol being completed with broken lines for ready reference. It is to be recognized that the broken lines in FIG. 29 are imaginary and intended only to associate the presence and absence of domains in pairs. The broken lines indicate an area somewhat smaller than that encompassed by type A symbols. In practice, those areas are equal, however, and the difference in areas is to be ignored herein. The pulse program for accomplishing this result comprises consecutive pulses on conductors H2P3, H2P1, H2P2, V8P3, V8P1 and V8P2.

Consecutive MINOR AND operations

Figure 30:
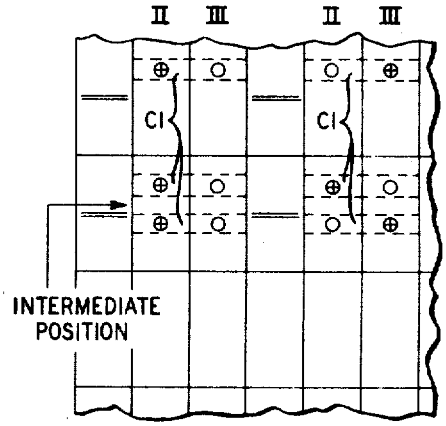

FIG. 29 shows the disposition of the illustrative stored match tags when a MINOR AND operation is initiated. A comparison between FIG. 29 and FIG. 2 shows that the indications in the representations in FIG. 29 are in blocks H5P2. First, the indications in the third (from the top as viewed) binary representations in each match tag are moved, upward as viewed, to blocks H3P2 spaced one position apart from the corresponding indications in the scond binary representations as shown in FIG. 30. The pulse program for carrying out this operation comprises consecutive pulses on conductors H6P2, H1P2, H2P2, and H3P2. Only the H conductors coupled to positions associated with the third binary representations are pulsed at this time.

Figure 31:
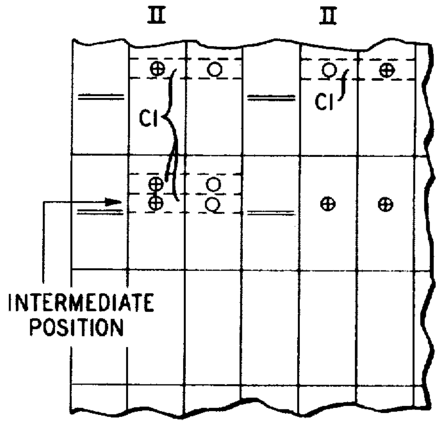

The MINOR AND operation comprises first a pulse on conductor H4P2 corresponding to the intermediate position as shown in FIG. 30. The disposition of domains as a result of that pulse is shown in FIG. 31. It is assumed illustratively that the third binary representation (domain) in word one moves into the intermediate position to the exclusion of the second binary representation (domain). It is noted that for the second and third binary representations in word two, no domain is so excluded and the result of this operation is that a domain from each representation moves to the intermediate position as shown in FIG. 31. Thereafter, a pulse, of a polarity to annihilate domains in corresponding blocks H4P2 is applied to the appropriate conductor H4P2. Next, a pulse is applied to conductor H4P2 moving any remaining domains into block H4P2.

Figure 32:
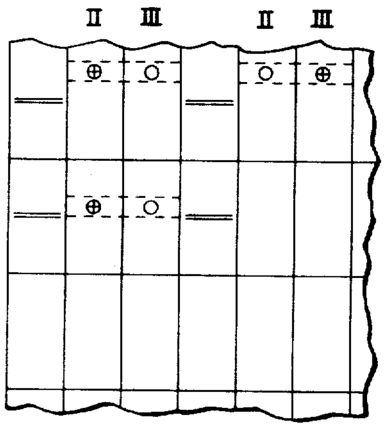

It is evident that MINOR AND operations are carried out concurrently on corresponding indications of the second and third binary representations. The results of the operations are shown in FIG. 32. For word one, a domain remains; for word two, none remains. The first binary representation in each word is unchanged by the operation as also shown in the figure.

Figure 35:
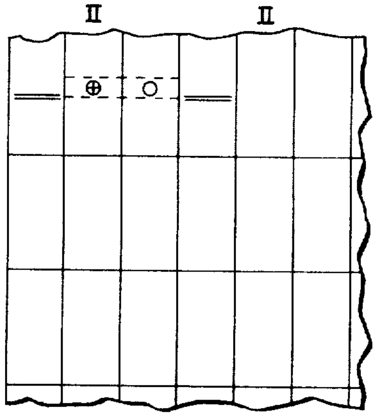
Figure 33:
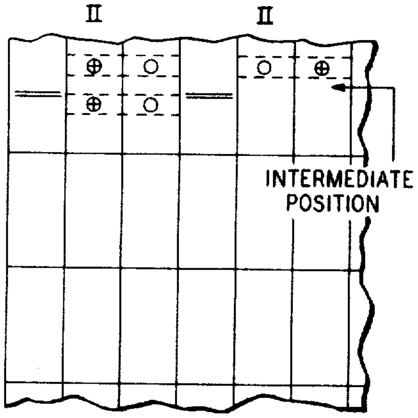
Figure 34:
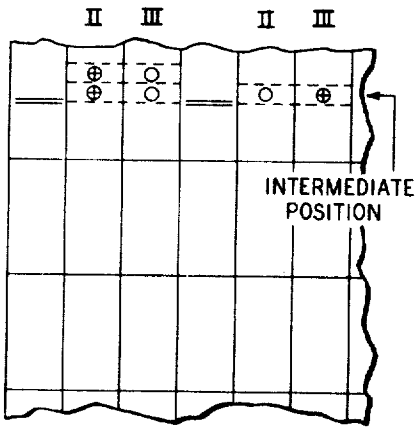

The concurrent MINOR AND operations are now repeated between the indications in the first binary representation of each stored match tag and the corresponding result of the previously described MINOR AND operations. Again, the operation requires the movement of the representation resulting from the previous AND operations upward to a position spaced apart one position from that of the first binary representation. The disposition of indications at various stages during this operation is shown in FIGS. 33 and 34. Only a single representation remains, as a result of the operation, as shown in FIG. 35. The pulse program to achieve the second illustrative concurrent MINOR AND operations is entirely analogous to that shown to carry out the first and accordingly is not detailed.

Only if a stored match tag matches the input tag will a domain appear in the position in a column II illustrated in FIG. 35.

It is apparent that the MINOR AND operations require, for example, fields in second and third bit locations but not in the first bit locations, and vice versa. For complete flexibility in this respect, an individual driver is provided illustratively for each H conductor. As will be discussed more fully hereinafter, more economical organizations are possible and these are achieved in accordance with well understood considerations. Since a discussion of such consideration is not necessary for an undertanding of this invention, the discussion is omitted at this juncture in the description. Importantly, the MINOR AND operations between corresponding indications in next adjacent binary representations in each match tag are carried out until a single representation or no representation remains for each stored match tag as shown for words one and two in FIG. 35, respectively.

Illustratively, if a representation remains, a match is indicated. If a representation is absent, a mismatch is indicated.

If a representation is present, a domain is positioned in the corresponding block H5P2 in th associated column II. Accordingly, the information indicating all matches in memory is also made available in memory. We may now direct our attention to organizing this information in a useful form.

Before proceeding, however, we must recognize that our choice of an illustration has been fortuitous. Had we illustrated a stored word which was the inverse of the input tag including all zeros in its match tag, for example, we would be left with a zero representation (a domain in a column III) in the position associated with that word in FIG. 35. This is, of course, of no consequence in the present operation because the presence of domains in columns III is not representative of matches and may be annihilated simply by applying to conductors V8P2 a pulse of a polarity to annihilate the domains in corresponding blocks.

Eliminating mismatched words

Figure 36:
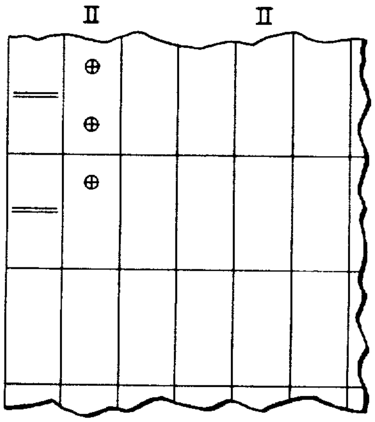

We now have an indication in a column II corresponding to each match tag in memory which matches the applied input tag. But we want to eliminate the mismatched words in memory. The procedure is as follows: The domain shown in column II of FIG. 35 is replicated five times in a manner discussed in connection with FIG. 5 to fill all cells in the bit locations of the stored match tag. (In practice, as many domains are generated as there are cells in a stored word.) As the additional domains are generated they are moved downward as viewed in FIG. 35 to positions shown in FIG. 36 for the first two additional domains and in FIG. 37 for five additional domains as well as for the original domain. The pulse program for achieving this result is consistent with that described in connection with FIG. 5 appropriately applied along with the basic propagation pulse sequence for moving each additional domain downward as each domain is generated.

Figure 37:
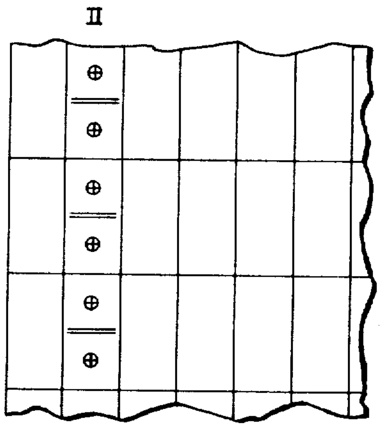
Figure 38:
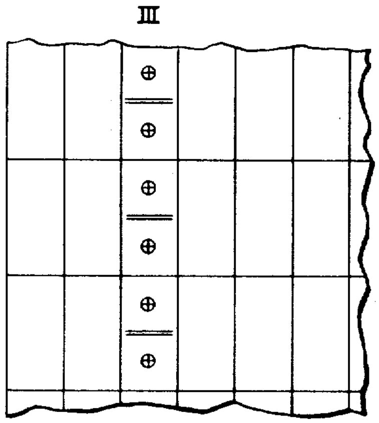

Next, the match information in column II as shown in FIG. 37 is propagated, in parallel, to column III as shown in FIG. 38. The pulse program for this is completely in keeping with the operation described in the aforementioned Bobeck-Gianola-Sherwood-Shockley application.

Replicate all words

Each word in memory is next replicated as described in connection with FIG. 24 regenerating the binary representations shown in that figure for the match tags only. Thereafter, the words, as shown in columns II of FIG. 24, are moved again to a logic portion of the sheet as shown in FIG. 25 in a manner discussed in connection with that figure. The resulting disposition of domains is shown in columns II of FIG. 39 for the match tag of each word. The pulse programs for realizing these operations are entirely analogous to those described above and are not described further at this juncture.

Figure 39:
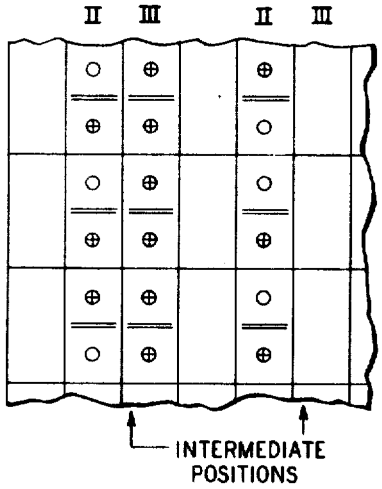

We now have a replication of each match tag (and associated word) in memory in a column II of the logic portion as shown in FIG. 39. We also have in adjacent columns III a continuous series of domains or alternatively no domains as an indication of whether or not each stored match tag matches the input tag.

Now a MINOR AND operation is carried out between the indications in the cells of each of the match tags in columns II and the corresponding match indications (domains) in next adjacent columns III. There is no necessity for a preliminary type A to type B transformation, as shown in FIGS. 28 and 29, in this instance because the information to be operated upon is in next adjacent columns of blocks rather than arranged vertically in one column of blocks as was the case earlier.

MINOR AND

Figure 40:
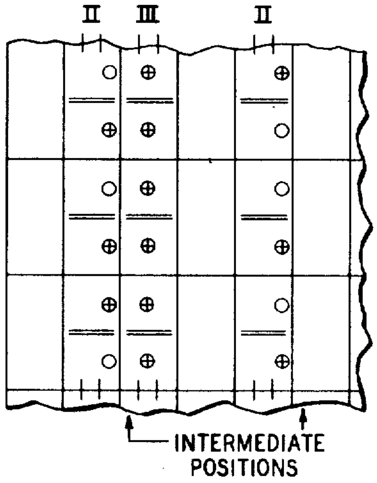
Figure 41:
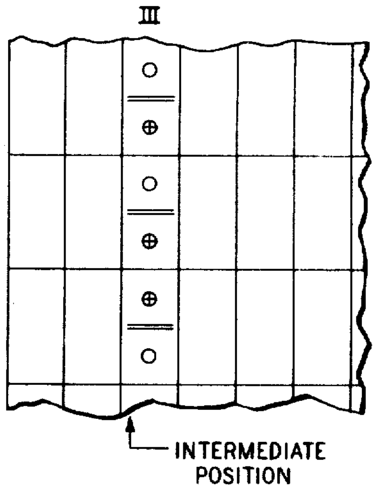

FIG. 40 shows the representations in column II moved one column of blocks to the right preliminary to the actual MINOR AND operation. FIG. 41 shows the result of the MINOR AND operation. The disposition of domains in FIG. 41 is identical to that representing the match tag of word 1 as shown in FIG. 23. No representation of word 2 remains as shown in FIG. 41. Accordingly, only matched words appear in the logic portion of sheet 11. Mismatched words are eliminated. Of course, as each binary representation in a match tag is generated, so is the entire corresponding stored word generated making available only the information associated with the stored match tags corresponding to the input tag.

The basic logic operations and the use of those operations to effect the familiar content addressing function have now been described. The use of information in the form provided by those operations is also familiar. For example, it may be desired to update information associated with a particular match tag. The updating information, then, may be introduced into the logic portion of the sheet as described in the aforementioned Bobeck-Gianola-Sherwood-Shockley application. That information is moved along columns of bit locations in the logic portion of sheet 11 of FIG. 1 to positions corresponding to that portion of the match wrds that is to be changed. The changes are effected in a manner consistent with that described above again using sequences of logic operation in accordance with well understood considerations. Alternatively, the match words may be considered stored in parallel in shift register channels for propagation to output positions as taught in the last-mentioned application for detection by utilization circuit 18 of FIG. 1 which may be a printer. The latter read out alternative is implemented by means of conductors coupled to those output positions as indicated by the inputs to uilization circuit 18 as shown in FIG. 1.

Hardware versus software

The basic structure of an arrangement in accordance with this invention requires the magnetic sheet and propagation conductors described in the aforementioned Bobeck-Gianola-Sherwood-Shockley application along with input and output arrangements entirely consistent with the teachings of that application. What is taught further herein is that a complete set of logic operations may be achieved in that structure in response to corresponding pulse programs on the propagation conductors. Further, it is also taught herein that consecutive pulse programs permit the realization of various familiar functions as indicated by an illustrative content addressing operation. It should be apparent to one skilled in the art that the realization of a complete set of logic operations also permits the realization of all computer operations.

At first blush, it would appear that we have gained structural simplicity at the expense of drive circuit sophistication. This is not the case. Sheet 11 is perfectly capable of storing micro-programs or subroutines in a portion thereof. Such a micro-program may take the form of consecutive binary words stored in parallel shift register channels operated entirely as described in the last-mentioned application. As will become clear, there is no necessity to read out, by external means, the information stored in these programs. Programming then would necessitate essentially only the ordering of such micro-programs responsive to input signals. Not only is ordering of micro-programs a relatively simple programming effort but a driver circuit responsive to such a program may be relatively simple also.

Figure 42:
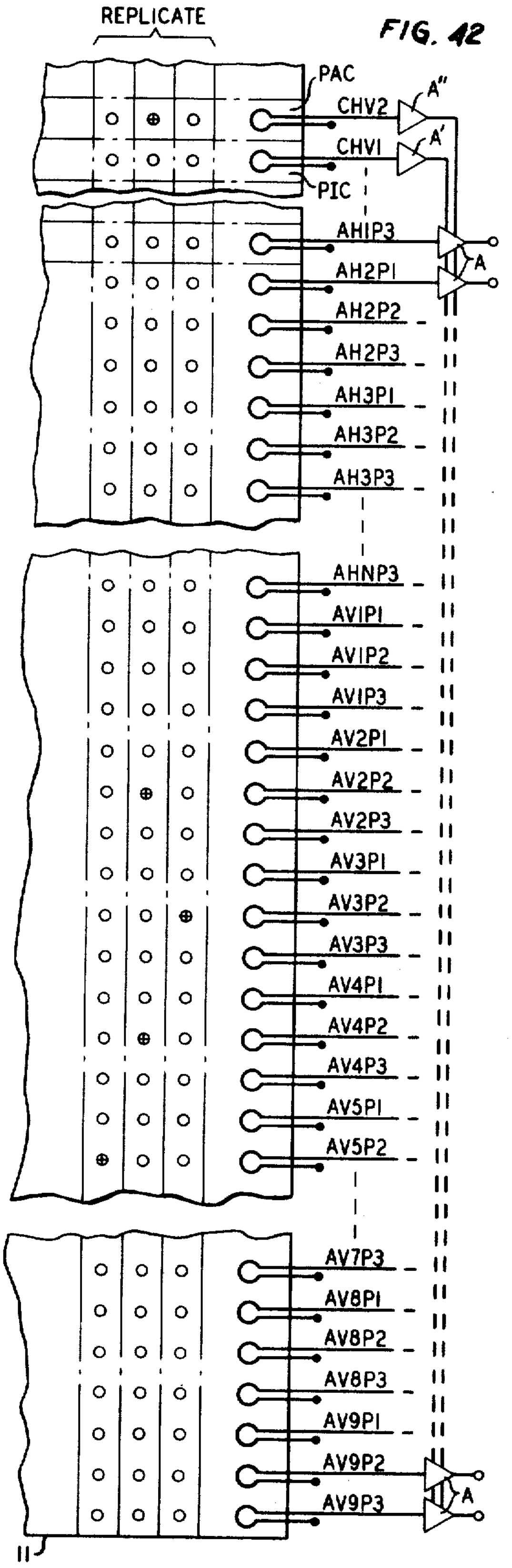

Let us turn our attention to FIG. 2 for a moment. Basically, six H conductors and nine V conductors are required for achieving all the described operations. Each of those conductors has three phases. Consequently, forty-five separate conductors couple the blocks of each basic unit in the arrangement. The like designated V conductors are used in common. Let us assume that each H conductor requires a separate driver. FIG. 42, then, shows a simple scheme for programming the drivers for achieving the illustrative operation.

FIG. 42 shows a portion of sheet 11, or alternatively a separate sheet, comprising a part of control circuit 16 of FIG. 1 in which a plurality of shift register channels are defined. Such shift register channel includes propagation means for advancing domains therealong from left to right as viewed in the figure. For this parallel propagation operation, additional propagation conductors may be utilized along with appropriate drivers (not shown). Such elements, however, are entirely analogous to those elements disclosed in the aforementioned Bobeck-Gianola-Sherwood-Shockley application. Domain patterns are stored in parallel in the several channels in a manner consistent with the teaching in that application.

Conductors AH1P1 . . . AV9P3 are coupled to output positions in corresponding channels each responsive to the passage of a domain for activating the correspondingly designated propagation conductor via associated amplifiers A indicated.

The corresponding domains in each channel are advanced to the output positions simultaneously and so constitute a binary word in a stored micro-program. The micro-program for the replicate operation is illustrated. The operation comprises first a pulse on conductor V3P2 followed by pulses on conductors V2P2 and V4P2 and finally a pulse on conductor V5P2. The replicate program, then, comprises simply three consecutive binary words each including a domain or domains corresponding to the propagation conductors to be pulsed. These domains are represented again by encircled plus signs in FIG. 42.

Means (not shown) are provided to rewrite domains into the corresponding channels after they are read out. Such means are entirely consistent with the teaching of the last-mentioned application and include, conveniently, an electrical or optical pickup at the output end of each channel for reproviding a domain at the input end of each channel each time a domain arrives at an output position.

An additional propagation channel is provided, as shown in FIG. 42, for advancing an additional domain in each binary word for controlling the polarity of the pulse applied to selected propagation conductors as is required for performing a MINOR AND operation for example. The additional channel is coupled by a control conductor CHV1. Conductor C1 is connected via an amplifier A' to each of amplifiers A. To this end, a switch is provided in each amplifier A responsive to an indication of the presence of the additional domain for determing the state of the switch and thus the pulse polarity provided in selected propagation conductors. The operation may be thought of as a pulse inversion operation where a domain in a pulse inversion channel, PIC, effects an inversion of the normal polarity of the pulse simultaneously applied to selected propagation conductors.

Various of the illustrative logic operations require augmented drive currents. For example, the replicate operation requires a pulse having an amplitude greater than the pulse required for simply moving a domain. An additional pulse augmenting channel, PAC, is provided to this end as shown in FIG. 42. An output conductor CHV2 coupled to such a channel responds to the passage of a domain to activate an amplifier A''. Amplifier A'', in turn, is connected to each of the amplifiers A of FIG. 42 to, for example, increase the gain of any amplifier A concurrently activated. Amplifier circuits operable in this fashion are considered straightforward.

The micro-program for the invert operation (not shown) conveniently includes domains for pulsing H conductors corresponding to all bits in a match character. The external signal indicating the bits to be inverted inhibits all but the desired H conductors.

If next consecutive micro-programs are programmed in the same manner to pulse the propagation conductors as required to perform the illustrative operation, all that is required to perform the illustrative multiple match operation is to initiate the advance of domains to the right as viewed in FIG. 42 in response to a first signal, conveniently the activation of an input to control circuit 16 of FIG. 1.

The program may be terminated conveniently by providing a domain in an additional channel (not shown) to inhibit further propagation, via control circuit 16 of FIG. 1, when the presence of that domain is detected at the corresponding output position. Alternatively, an "end-of-program" micro-program may be included in existing channels.

Of course, the programs may be rewritten and/or rearranged to perform different functions. It is clear then that the sequence of various logic operations determines the function performed and that various sequences may be stored separately in the manner shown in FIG. 42 for selection in response to an associated signal input to control circuit 16.

Figure 43:
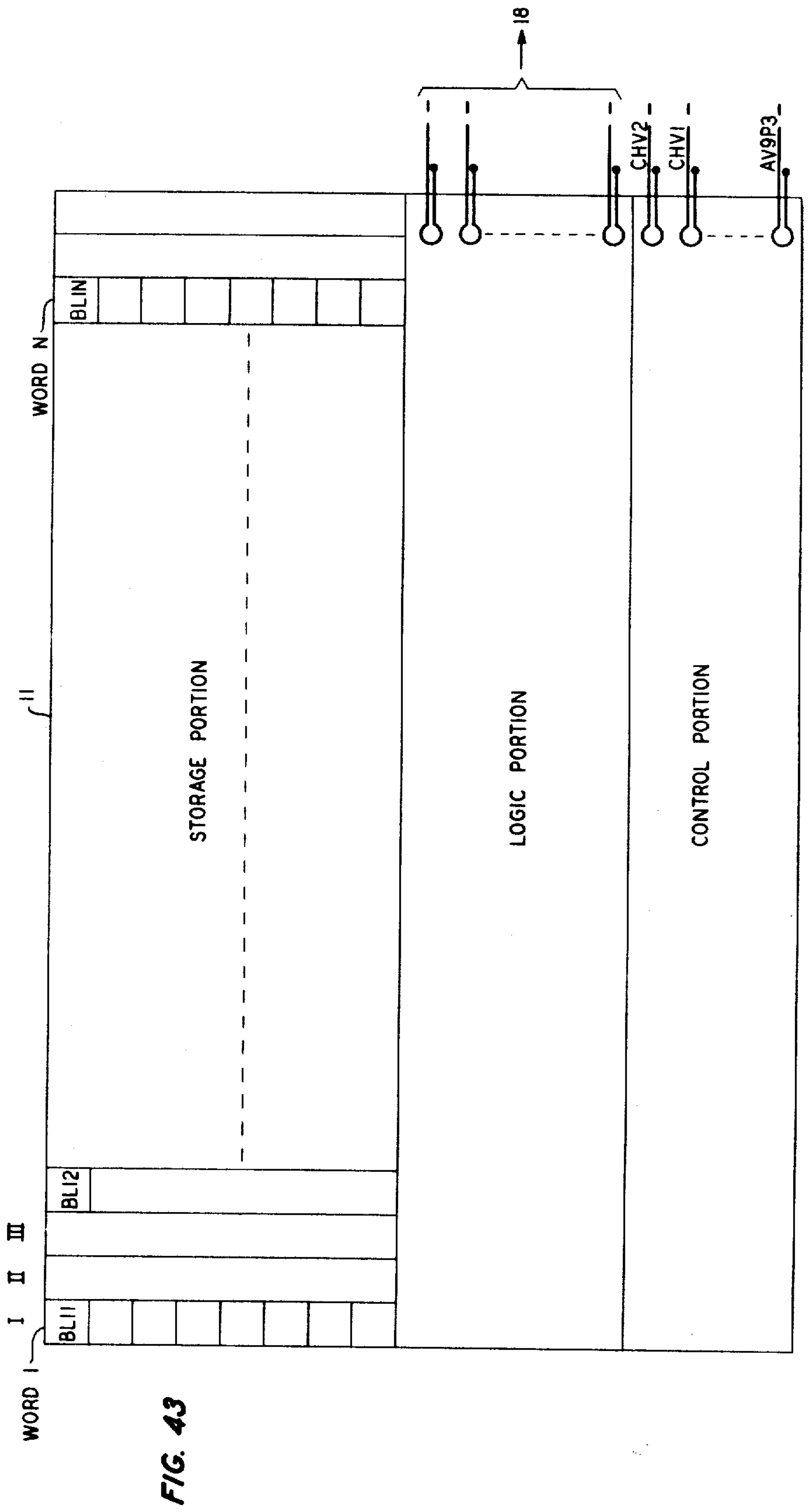
FIG. 43 is a schematic illustration of a system organization of the memory arrangement of FIG. 1.

FIG. 43 shows the system organization of sheet 11 of FIG. 1 into storage and logic portions as described and including a control portion as shown in FIG. 42 in detail. The column indications of FIG. 2 are repeated as well as the control portion outputs, as shown in FIG. 42, for consistency. The logic portion is shown including outputs to circuit 18 of FIG. 1.

As described, the basic unit into which the memory of FIG. 1 is organized requires forty-five drive conductors and these are, ideally, shared with each other basic unit. Some operations may, and indeed complete flexibility does, require that various basic units be pulsed while others are not as is clear from the illustrative operation.

Accordingly, the illustrative implementation calls for the H conductors to have separate drivers. It is, of course, more economical to minimize the number of drivers. This may be accomplished by keeping the number of H conductors low, ideally to a small number related to the number of bits in a word. Alternatively, the logic operations may be programmed in a manner to permit common driving of like designated H conductors. Such considerations may lead to the reorganization of the memory into basic operational units of different numbers of blocks. In any case, the most economical organization is determined in accordance with well known considerations and not discussed fully herein. It is important to note, however, that it is not necessary to change the propagation circuitry geometry in order to change the basic operational unit. All that is necessary is that the existing conductors be programmed differently.

The invention, also, has been illustrated in terms of an information representation wherein a domain is present in a prescribed position in a bit location and a domain is absent simultaneously in another prescribed position in the same bit location. The representation appears to be redundant; a binary one and a binary zero may be represented by the presence and absence of a domain in only one position in a bit location. It would seem that packing densities would be increased if the latter representation were used. This would be so of course. But the various logic operations would be implemented less easily with the simple uniform coupling configuration for propagation conductors as shown in FIG. 2. Indications are that even further redundancy permits additional simplicity in performing logic functions. Various tradeoffs between packing densities and simplicity in logic operations, accordingly, are permitted. The structure shown in FIGS. 1 and 2 permits a great deal of latitude in this regard. Again, one need only change the propagation pulse program to change the entire operation and/or the basic operational unit.

Further simplicity in operation may be realized without changing the basic operational unit already described. For example, the match indications could be generated more simply if the zero representations were annihilated before the rotation from type A to type B form were carried out. In fact, in this instance, A to B rotation is unnecessary. The illustrative operation permits the illustration of a greater number of logic operations, however. Again, no structural changes are necessary to implement the simpler operation. Only a change in the program discussed in connection with FIG. 42 is necessary.

The invention has been described in terms of propagation conductors having a loop configuration. Such a configuration is merely illustrative. The above-mentioned copending Bobeck-Fischer application describes an alternative configuration which permits increased packing densities.

As has been mentioned above, it is possible to relate the various logic operations to four basic physical steps. These steps have been indicated throughout the discussion of the logic operations. It is well to emphasize them here, however, because the considerations underlying various extensions of, as well as constraints to, the logic operations in accordance with this invention are also emphasized in this manner.

The physical steps common to the illustrative logic operations are: (1) the movement of a domain, (2) annihilation of a domain, (3) splitting of a domain, and (4) collision between domains.

The movement of a domain has been described in, for example, the aforementioned Bobeck-Gianola-Sherwood-Shockley application. Typically, movement is effected by providing a field of an oersted or two offset from the position of the single wall domain and of a polarity corresponding to the domain. The domain, then, "sees" a potential well and moves to its new least energy position. The propagation field need only exceed a propagation threshold characteristic of the material in which the domain is moved.

The annihiliation of a domain requires a field again of only an oersted or two typically no more than ten oersteds, generated at the position of a domain. The field, however, is of a polarity to collapse the domain. For annihilation it is necessary only to exceed a stability threshold characteristic of the material.

Splitting of a domain into at least two other domains requires larger fields than are necessary to move or annihilate domains. This because the operation entails the pinching of a domain into two. The pinching steps requires that two walls be driven together, necessitating a field approaching $4\pi M_s$, where $M_s$ is the saturation magnetization of the material, typically 100 oersteds.

Collision between domains as used merely prevents movement in response to a propagation field and thus necessitates no higher level field.

In one arrangement, drive conductors were arranged conveniently in orthogonal slots formed in a high permeability base plate rather than by a separate printed circuit. A sheet of erbium orthoferrite ($ErFeO_3$) was positioned over the posts formed by the slots. The various physical steps were performed as described above in response to drive currents as follows:

Propagate+150 milliamperes
Annihilate+85 milliamperes
Split+500 milliamperes
Collision+150 milliamperes The domains had diameters of about 14 mils, slightly larger than the post size which has 10 mils on a side with five mil slots.

A recitation of packing density capability as well as other operating parameters provides a more meaningful appreciation for the memory arrangement of FIG. 1. Specifically, domains on the order of a half mil are moved via one-tenth mil printed circuitry of the type described in the last-mentioned application permitting a packing density of more than $10^5$ domains per square inch. Drive currents of about 50 milliamperes are employed. The arrangement is capable of providing all matches in memory in about the millisecond.

The logic operations described form a complete set with which all computer operations may be realized. Some of those operations, such as the replicate operation where splitting of a domain is required, necessitate that the area of the domain be enlarged. In other operations such as the MINOR AND operation the domain area is not enlarged. A complete set of logic operation in which some operations are carried out without enlarging domain area and in which other operations require such enlargement are called mixed sets.

We may form a complete set of logic operations, however, without ever enlarging the area of a domain. In such cases, a reservoir of domains is provided, for example, in each bit location with an attending reduction in the packing density of any given memory. Of the basic physical steps only movement and collision need be used. The physical splitting and the annihilate steps need not be employed in this instance. Rather, domains are conserved and operations such as the replicate and annihilate operations are carried out on a logic basis where domains are borrowed from and returned to a reservoir.

A typical operation in this mode may employ the collision interaction between two domains. For example, visualize two rows of three blocks forming three columns. Each block in the first column is occupied by a domain. The block in the first row, third column is also occupied by a domain. The object is to try and move the two domains in the first column to corresponding blocks in the second by generating propagation fields in those corresponding blocks. If the domain in the third column is made stationary, only the domain in the first column, second row moves to its corresponding block. The repulsion force between domains in the first row prevents such movement there. The operation in the first row enables us to form an AND operation. The operation in the second row enables us to form an OR operation.

The wiring geometry, field intensities, coercivity, etc., determine whether the collision interaction is effective over a single domain position (block) or two (or more) positions.

Operation with domains that retain their shape is possible over an operating range which is characteristic of the magnetic material employed. The multishaped domains existing in, for example, orthoferrite sheets, heated to the Curie point and then cooled to room temperature, are a familiar sight. When a bias field is applied in a (negative) direction normal to such a sheet, the domain shapes change. At a particular bias field each domain becomes circular (actually cylindrical) having a radius which is a function of the material and the geometry of the sheet. Further increases in bias eventually exceed a stability threshold causing the circular domains to collapse. A pure set of logic operations where domains retain their shape and are neither replicated nor annihilated employ background bias fields in a range to maintain the domains circular. A bias field for this purpose is provided conveniently by means of a permanent magnet not shown.

A complete set of logic functions may also be performed in a magnetic sheet wherein the domains may not be circular. The magnetic sheets in which operations of this type are carried out, however, are coercive force dominated. That is to say, the material is characterized by a preselected coercivity to domain wall motion. A domain in coercive force dominated sheets, then, takes any form required by the applied fields and remains in that form when the fields are removed. The geometry of the various conductors is controlling in this connection. Some background bias may be present also. Domains are not conserved in such a mode.

The mixed set of logic operations described requires both a preselected coercivity of, for example, 1.0 oersted, and a background bias of 8 oersteds. The coercivity and bias for providing optimum margins is easily obtainable by experimentation for each magnetic sheet.

The invention has been described in terms of single wall domains having a preferred direction of flux substantially normal to the plane of the sheet in which those domains are moved. Single wall domains are also formed in anisotropic magnetic sheets in which a preferred direction of flux is in the plane of the sheet. Neighboring domains in such a sheet exhibit repulsion forces only when they are situated along the hard axis of such materials with respect to one another. Neighboring domains situated along the easy axis exhibit attractive forces.

Logic may be performed with single wall domains in such anisotropic sheets also. All that is required is that the domain wall encompassing the single wall domain close on itself to form a boundary for the domain independent of the boundary of the magnetic sheet in which the domain is moved.

What has been described is considered only illustrative of the principles of this invention. Accordingly, various modifications may be made therein by one skilled in the art without departing from the spirit and scope of the invention.

What is claimed is:

1. A combination comprising: a sheet of magnetic material in which single wall domains can be moved and annihilated controllably in response to a first field of a first polarity and to a second field of a second polarity respectively; means for selectively providing first and second fields in selected positions in said sheet, and signal responsive means operative upon said last-mentioned means for providing said fields in a pattern to perform a logic operation with said single wall domains.

2. A combination in accordance with claim 1 wherein said positions are associated in sets each including a first and a second position wherein the presence and absence of a domain, respectively, represents a first binary value and wherein the absence and presence of a domain, respectively, represents a second binary value, wherein said signal responsive means is responsive to a signal for generating a program of field patterns for exchanging the presence and absence of domains in said first and second positions one for the other.

3. A combination in accordance with claim 1 wherein said means for selectively providing first and second fields comprises a plurality of conductors each including like coupling geometry in associated sets in said sheet.

4. An AND circuit comprising: a sheet of material having a preferred magnetization direction substantially normal to the plane of the sheet and being capable of having single wall domains moved in said sheet by a propagation field in excess of a propagation threshold, means for selectively providing a domain in first and second positions spaced apart by an intermediate position in said sheet; means for generating a first propagation field in said intermediate position for moving to said intermediate position a domain in said first or second position, means for annihilating a domain in said intermediate position; means for generating a second propagation field in said intermediate position, and means for detecting the presence of a domain in said intermediate position.

5. An OR circuit comprising: a sheet of material having a preferred magnetization direction substantially normal to the plane of the sheet and being capable of having single wall domains moved in said sheet by a propagation field in excess of a propagation threshold; means for selectively providing a domain in first and second positions spaced apart by an intermediate position in said sheet; means for generating a first propagation field in said intermediate position for moving to said intermediate position a domain in said first or second position; means for annihilating domains in said first and second positions, and means for detecting the presence of a domain in said intermediate position.

6. A combination comprising a sheet of magnetic material capable of supporting single wall domains therein, drive means including a plurality of conductors coupled to said sheet in a manner to define a plurality of positions for single wall domains in said sheet, a plurality of propagation channels for single wall domains each corresponding to a different one of said conductors, means for propagating patterns of single wall domains in said channels in parallel, and means responsive to the arrival of single wall domains at output positions in corresponding ones of said channels for providing pulses of a first polarity and first amplitude in corresponding conductors.

7. A combintion in accordance with claim 6 wherein said conductors couple each position in said sheet in a like manner.

8. A combination in accordance with claim 7 also including an additional propagation channel and means responsive to the arrival of a single wall domain at an output position therein for inverting to a second polarity pulses provided simultaneously in said conductors.

9. A combination in accordance with claim 7 also including an additional propagation channel and means responsive to the arrival of a single wall domain at an output position in said additional channel for changing the amplitudes of pulses provided simultaneously in said conductors.

10. A combination in accordance with claim 7 including means for generating a bias field in said sheet for maintaining said single wall domains in a specified geometry.

11. A combination in accordance with claim 7 wherein said sheet is characterized by a coercive force sufficient to prevent the movement of single wall domains in the absence of a propagating field.

12. Data processing apparatus comprising a sheet of magnetic material capable of having single wall domains moved therein, the presence and absence of domains in said sheet defining binary representations, said sheet being divided into storage and logic portions, and means for performing logic operations simultaneously on binary representations in said sheet, said last-mentioned means comprising means for moving binary representations from said storage portion to said logic portion and means for generating in said logic portion a pattern of fields for selectively reducing the distances between neigboring binary representations in a manner to use repulsion forces between domains in those representations for performing logic operations therebetween.

13. Data processing apparatus in accorance with claim 12 wherein said sheet also includes a control portion comprising a plurality of channels for single wall domains, and means responsive to consecutive patterns of domains in said channels for generating said consecutive patterns of fields.

14. Data processing apparatus in accordance with claim 13 wherein each of said storage, logic, and control portions occupies a separate area in said sheet.

15. Data processing apparatus in accordance with claim 13 wherein each of said storage and logic portions occupies areas distributed throughout said sheet.

16. Data processing apparatus in accordance with claim 12 including means for organizing binary representations into binary words each having a match tag, means for moving each of said match tags from said storage to said logic portion, means for storing in said logic portion a plurality of representations of an input tag including a pattern of first and second binary representations, means responsive to the storage of the representation of an input tag for converting each of those binary representations of the match tags which matches in position a second binary representation in the input tag to said first binary representation, and means for eliminating from said logic portion each of said binary words for which an all first binary representation is absent.

17. Data processing apparatus in accordance with claim 16 including means coupled to said logic portion for detecting binary words for which said single binary representation is present.

18. An associative memory comprising a sheet of magnetic material including a pattern of single wall domains, the presence and absence of single wall domains in said sheet defining first and second binary representations, means for associating binary representations into binary words in a storage portion of said memory, means for replicating binary words in said storage portion, means for moving replications of binary words to a logic portion of said memory, means responsive to an input tag for converting only like positioned ones of said representations in each binary word in said logic portion to said first binary representaton thus formng thereof a series of like indications only for those representations in each word which match the input tag, and means for eliminating all mismatched words from said logic portion.

19. An associative memory in accordance with claim 18 wherein said last-mentioned means includes means performing AND operations between said indications and replications of corresponding binary words to eliminate all binary words for which said indications are absent.

20. A method of operating on a pair of single wall domains in a magnetic sheet to perform logic operations therewith, said method comprising the steps of selectively moving said domains to first and second positions spaced apart by an intermediate position, and generating in said first, second and intermediate positions in said sheet consecutive patterns of first and second fields of first and second polarities respectively for selectively reducing the distance between and annihilating said domains.

21. A method of operating on a pair of single wall domains in a magnetic sheet for performing logic operations therewith, said method comprising the steps of selectively moving said domains to first and second positions spaced apart by an intermediate position, generating in said intermediate position a field tending to move to said intermediate position domains in said first and second positions, and thereafter generating in said first and second positions fields of a polarity to annihilate domains there thus performing an OR operation.

22. A method of operating on a pair of single wall domains in a magnetic sheet for performing logic operations therewith, said method comprising the steps of selectively moving said domains to first and second positions spaced apart by an intermediate position, generating in said intermediate position a field tending to move to said intermediate position domains in said first and second positions, and thereafter generating in said intermediate position a field of a polarity to annihilate domains there thus performing an AND operation.

23. A method of operating on a pair of single wall domains in a magnetic sheet for performing logic operations therewith, said method comprising the steps of selectively moving said domains to first and second positions spaced apart by an intermediate position, generating in said intermediate position a field tending to move to said intermediate position domains in said first and second positions, and thereafter generating fields in both of said first and second positions to move thereto a domain in said intermediate position thus performing a replicate operation.

24. Apparatus comprising a body of magnetic material in a plane of which single wall domains can be moved, each domain in said plane comprising a magnetic dipole disposed transverse to said plane and exhibiting a repulsion force on neighboring ones of said domains, first means for defining in said plane an array of positions for said domains, said positions being spaced apart a first distance at which said repulsion force is negligible when domains are moved from ones of said positions to others, second means for selectively moving domains from selected ones of said positions to others thereof in a manner to preserve said first distance therebetween, and third means for selectively reducing the distance between neighboring domains in a manner to use said repulsion force to carry out logic operations therebetween.

25. Apparatus in accordance with claim 24 wherein the presence or absence of domains in one of said positions represents a binary representation, also including fourth means for selectively annihilating binary representations in neighboring positions.

26. Apparatus in accordance with claim 24 wherein the presence or absence of domains in one of said positions represents a binary representation, also including fourth means for selectively annihilating a binary representation the distance of which from a neighboring representation is reduced from said first distance.

27. Apparatus in accordance with claim 25 wherein said first, second, third and fourth means include a plurality of conductors coupled to said positions and means for generating currents in said conductors of polarities to provide localized magnetic fields in consecutive patterns for selectively reducing distances between neighboring binary representations and for annihilating binary representations not so moved to reduced distances from neighboring representations.

28. A combination comprising a sheet of magnetic material in which single wall domains can be moved, the presence and absence of domains in prescribed positions in said sheet defining binary representations, means for moving first and second binary representations to first and second positions at which repulsion forces between domains therein are negligible, means for attracting the domains of said binary representations in said first and second positions to an intermediate position therebetween in a manner to utilize said repulsion forces to deny said intermediate position to one of said representations, and means for generating selectively in said first, second and intermediate positions fields for reorganizing said representations into a single representation of a logical result of the denial of access to said intermediate position of said one representation.

References Cited

UNITED STATES PATENTS

| | | | |
|---|---|---|---|
| 3,151,315 | 9/1964 | Dunham et al. | 340—174 |
| 3,176,276 | 3/1965 | Smith | 340—174 |
| 3,185,965 | 5/1965 | Lee | 340—172.5 |
| 3,284,779 | 11/1966 | Lee et al. | 340—172.5 |
| 3,292,002 | 12/1966 | Enomoto et al. | 307—88 |
| 3,438,016 | 4/1969 | Spain | 340—174 |
| 3,460,116 | 8/1969 | Bobeck et al. | 340—174 |

OTHER REFERENCES

Journal of Applied Physics, vol. 37, No. 7, June 1966, "Controlled Domain Tip Propagation," Parts I and II, by Spain and Jauvtis (pp. 2572–2593).

Proceedings of the Spring Joint Computer Conference, 1967, "DTPL Push Down List Memory," by Spain et al. (pp. 491–498).

IEEE Transactions on Magnetics, vol. Mag. 3, No. 3, September 1967, "Threshold Fields for Domain Tip Propagation," by Spain (pp. 334–339).

PAUL J. HENON, Primary Examiner

U.S. Cl. X.R.

307—88; 340—174